United States Patent [19]

Shirai et al.

[11] Patent Number: 5,062,053

[45] Date of Patent: Oct. 29, 1991

[54] FULLY AUTOMATIC OPERATION SYSTEM FOR INJECTION MOLDING MACHINES

[75] Inventors: Kanji Shirai; Hideo Tanaka; Hideo Banzai; Tsutomu Hosoya, all of Shizuoka, Japan

[73] Assignee: Toshiba Machine Co., Ltd., Tokyo, Japan

[21] Appl. No.: 433,049

[22] Filed: Nov. 7, 1989

[30] Foreign Application Priority Data

Nov. 9, 1988 [JP] Japan .................. 63-281363

[51] Int. Cl.⁵ .................. G06F 15/46
[52] U.S. Cl. .................. 364/476; 425/136
[58] Field of Search .......... 364/476, 477, 473; 425/135, 136, 143, 158, 160, 170; 264/40.6; 219/506

[56] References Cited

U.S. PATENT DOCUMENTS

4,421,467 12/1983 Richmond .................. 425/169
4,695,237  9/1987 Inaba ........................ 364/477
4,750,131  6/1988 Martinez .................... 364/476
4,751,371  6/1988 Clinton ...................... 219/506
4,802,834  2/1989 Neko ......................... 425/138
4,823,274  4/1989 Kiya et al. .................. 364/476
4,847,023  7/1989 Neko ......................... 364/476
4,847,779  7/1989 Masao et al. ................ 364/476
4,849,678  7/1989 Kamisuchi et al. ........... 364/476
4,899,288  2/1990 Tsutsumi .................... 364/476

Primary Examiner—Jerry Smith
Assistant Examiner—Jim Trammell
Attorney, Agent, or Firm—Young & Thompson

[57] ABSTRACT

A full automatic operation system for an injection molding machine which is capable of smoothly and automatically starting the purge and start-up operations and then beginning to produce the completely molded products after the barrel, mold and hydraulic fluid are heated to their optimum temperatures, respectively, automatically stopping the molding operation in case that continuous production of incomplete molded products or an abnormal condition in the molding machine occurs during the automatic operation and automatically restarting the operation after the stop.

3 Claims, 6 Drawing Sheets

FULLY AUTOMATIC OPERATION SYSTEM FOR INJECTION MOLDING MACHINES

FIELD OF THE INVENTION

This invention relates to a fully automatic operation system for an injection molding machine, particularly to a full automatic operation system capable of automatically operating the injection molding machine through all the processes including a start-up, molding and stop.

BACKGROUND OF THE INVENTION

Conventionally, as disclosed in the Japanese patent publication 61-9128, there has been proposed an automatic operation control system. The control system contemplates reasonably executing such operations as a preparation of a mold for a molding operation, exchange of a material, a preparation of a molding machine and a setting of a molding amount and condition, because these operations are required to be executed in a short time and with a considerable efficiency owing to providing as peripheral devices a material feed device and a mold exchange device particularly in the injection molding machine to be used for producing a small amount of lots (a few to several tens lots) in a wide variety of products.

In the automatic operation control system comprising an injection molding machine, a material feed device and a mold exchange device, the molding machine and devices respectively have their exclusive controllers which are controlled as a whole by a main control unit, memory and input/output (I/O) device. The main control unit can read out through the I/O device the designated data relative to a molding preparation condition and a molding condition being entered into the memory and can transfer the data to the respective controllers which control operations of the injection molding machine, the material feed device and the mold exchange device according to such data.

The automatic molding system in the conventional injection molding machines is provided mainly to achieve a purpose of automation of a molding process in which products are molded. There is no proposal and implementation of automation of such operations as heating of a barrel, mold and hydraulic fluid, etc., a purge step before a molding operation, several stat-ups before beginning to produce completely molded products, an emergency stop under an abnormal condition an a restart following the stop. Almost all the operations are done manually except for only several operations including automatic energization of heaters by which a barrel and a mold is heated by using a calendar timer.

Therefore, conventionally, in this type of the injection molding machine, it is required to automate its start-up operation before beginning to produce the completely molded products and also required to immediately stop a molding operation when an emergency condition occurs during an automatic molding operation and return a proper start-up operation according to a timing of the stop upon restarting, so that a productivity of molding the products cannot be reduced.

SUMMARY OF THE INVENTION

An object of the present invention is to provide a fully automatic operation system for an injection molding machine which is capable of smoothly and automatically starting the purge and start-up operations and then beginning to produce the completely molded products after the barrel, mold and hydraulic fluid are heated to their optimum temperatures, respectively, automatically stopping the molding operation in case that continuous production of incomplete molded products or an abnormal condition in the molding machine occurs during the automatic operation and automatically restarting the operation after the stop.

In accordance with the present invention, there is provided a full automatic operation system for an injection molding machine including an injection device, a mold and a mold clamping device comprising:

detecting means for detecting initialization temperatures at which conditions of a mold or a hot runner, etc., a barrel of the injection device and a hydraulic fluid are optimized for a start-up operation of the injection molding machine;

start-up condition setting means for setting a condition to perform a start-up operation comprising a plurality of steps after initialization temperatures are set;

molding condition setting means for setting a condition to start a molding of complete products after a termination of the start-up operation;

means for counting the number of shots of products once a molding of the products starts and for generating a molding-end signal when the number of shots reaches a set value;

means for detecting and judging an abnormal condition, and generating an abnormal signal in case the abnormal condition occurs during a molding process;

an automatic control unit for;
  judging that the initialization is completed by entering a detection signal when the initialization temperatures are reached;
  commanding to stop a molding operation by entering a molding-end signal while generating control signals to respective control devices by loading a start-up condition; and
  counting a time elapsed from a temporary stop in response to entrance of an abnormal signal up to a restart of a molding operation, so that the start-up operation restarts if the elapsed time being counted does not exceed a predetermined value, while the purge operation restarts before the start-up operation is done or all of heaters and hydraulic pumps are turned off if the elapsed time being counted exceeds the predetermined value.

The fully automatic operation system according to the invention comprises the start-up condition setting means which can set a molding condition, all the number of shots and subsequent steps to be designated, respectively, so that the molding operation can start under the set molding condition when a mold or a hot runner, etc. and a barrel are heated up to the respective temperatures being set for a molding of complete products while a molding condition setting means for setting a complete molding condition can be operated after the end of the required start-up operation.

According to the invention, it is preferable that the fully automatic operation system further comprises means for setting a timing for ON operations of the heaters for the molds and barrels and of the hydraulic pumps and performing the ON operations in order to start initializations of the temperatures of the molds and barrels and the temperature of the hydraulic fluid.

The fully automatic operation system for an injection molding machine according to the present invention can realize a convenient and smooth start-up of the injection molding machine by providing a plurality of means in which the respective temperatures of molds, barrels and hydraulic fluids are properly initialized, and after completion of the initialization a start-up condition is set to automatically execute a start-up operation constituted by a plurality of steps. After the completion of the start-up operation, the automatic molding operation is executed as conventionally done by loading a molding condition for complete products. However, particularly in the fully automatic operation system according to the present invention, while a detection of any abnormal condition during a molding process leads to a temporary stop of a molding operation and a counting of the time elapsed from the stop is initiated, a start-up operation is restarted if a time elapsed to remove the abnormality does not exceed such a range as to cause any influence on the start-up. Therefore, it is possible to compensate a reduction of operating ratio due to an emergency stop of the injection molding machine and improve a productivity of the machine. It is also possible to improve the operating ratio of the injection molding machine and facilitate an operator's work and a maintenance of the machine because the system enters into an adequate standby in preparation for starting the next molding operation while all the injection molding operation are stopped after a completion of molding the predetermined number of shots being detected, so that the capabilities of the full automatic injecting molding machine are extremely expanded.

Described below in depth by referring to attached drawings are some of the example embodiments of the fully automatic operation system for injection molding machines under this invention.

PREFERRED EMBODIMENTS OF THE INVENTION

Figure 1:
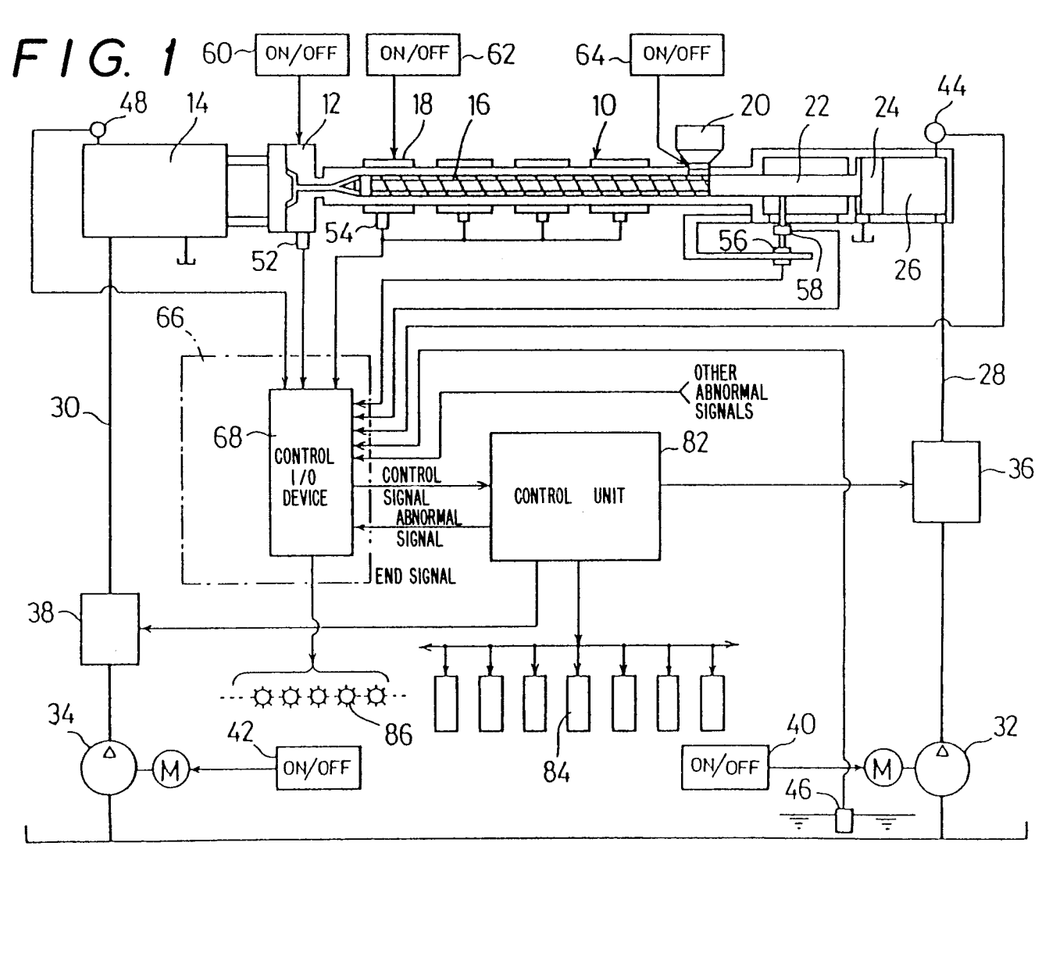
FIG. 1 is a block diagram showing a fully automatic operation system for an injection molding machine according to a preferred embodiment of the present invention.

FIG. 1 shows an embodiment illustrating a system of an injection molding machine for performing a fully automatic operation according to the invention.

Referring to FIG. 1, numerical references 10, 12 and 14 represent an injection device, a mold and a clamping device, respectively. The injection device 10 comprises an injection screw 16, a barrel 18 for heating an injection cylinder, a hopper 20 for charging a resin material to be molded, an injection plunger 22, an injection piston 24 and a hydraulic cylinder 26 to which a hydraulic control system 28 is connected. In this embodiment, the injection screw 16 and the injection plunger 22 are integrally constituted so as to be rotated by a hydraulic motor. Further, in the injection device 10 described above, the clamping device 14 comprises a control facility (not shown) performing opening and closing operations of the mold 12, to which a hydraulic control system 30 is connected.

The hydraulic control systems 28 and 30 respectively are provided with hydraulic pumps 32 and 34 and hydraulic controllers 36 and 38 for performing speed and pressure controls of the injection device 10 and the clamping device 14. The hydraulic pumps 32 and 34 have control means 40 and 42 for performing an ON-OFF control of these pumps. Furthermore, a pressure sensor 48 is provided in the vicinity of the clamping device 14 connected to the hydraulic control system 30, while a pressure sensor 44 and a thermal sensor 46 are provided in the vicinity of the injection device 10 connected to the hydraulic control system 28.

Meanwhile, the mold 12 of the injection molding machine comprises therein a heater (not shown) or is connected to a mold temperature controller, while each of barrels 18 is provided therein with a heater (not shown). These heaters heat the mold 12 and the injection cylinder, respectively, up to an adequate temperature and keep the temperature so that a desirable injection molding can be achieved. Accordingly, the mold 12 and barrel 18 are provided with thermal sensors 52 and 54, respectively. Moreover, since it is required to properly set an injection speed and pressure relative to a position of the injection screw 16 in order to perform an adequate injection molding, the injection plunger 22 is provided with a position sensor 56 and a speed sensor 58 which respectively detect a variable position and speed thereof. The heaters (not shown) provided in the mold 12 and the barrel 18 comprise control means 60 and 62 for performing an ON-OFF operation. The hopper 20 is provided with a control means 64 for performing an ON-OFF operation of a control valve which controls feeding of a resin.

Figure 2:
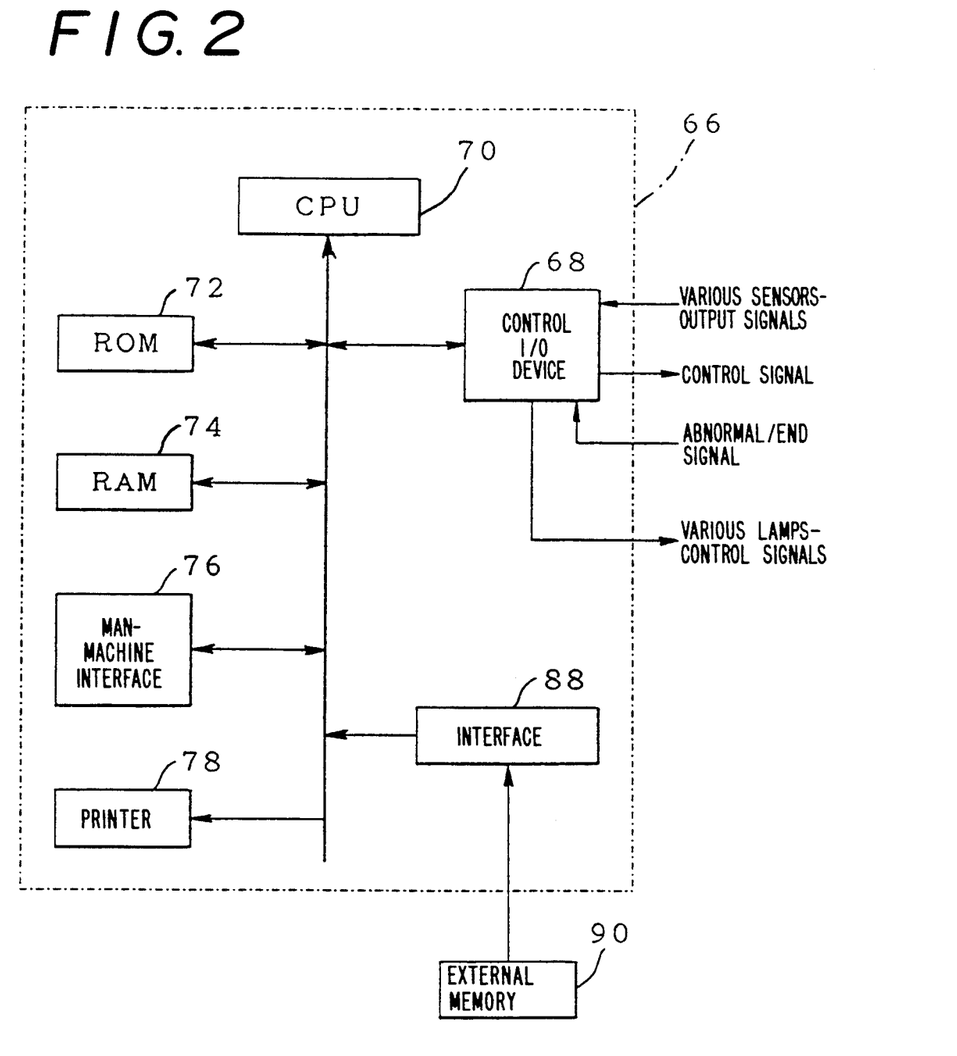
FIG. 2 is a block diagram of an automatic control unit shown in FIG. 1.

Therefore, in the fully automatic injection molding machine according to the present invention, the pressure sensor 44, thermal sensors 46, 52 and 54, position sensor 56 and speed sensor 58 which are provided in the respective control means described above are connected to a control I/O device 68 of an automatic control unit 66 so that output signals from the respective sensors may be entered into the control I/O device. As shown in FIG. 2, the automatic control unit 66 comprises a CPU 70, ROM 72, RAM 74, man-machine interface 76 and printer 78 each component of which are mutually connected through a bus line to both the CPU 70 and the control I/O device 68. The control I/O device 68 is connected to a means for controlling the respective parts of the injection molding machine, particularly to a control unit 82 for controlling hydraulic controllers 36 and 38 provided in hydraulic control systems 28 and 30 which control the injection device 10 and the clamping device 14. Therefore, the control unit 82 may be appropriately connected to a controller 84 for performing other control operations as required. In such a case, the control I/O device 68 generates a control signal to the control unit 82 in accordance with a proper injection molding condition and receives from the control unit 82 an abnormal signal indicating an abnormal condition of respective controllers and an end signal indicating the end of the predetermined injection molding control. Moreover, the control I/O device 68 is set to generate the control signal for lighting various display lamps 86 which notifies an operator of an abnormal or proper condition of the respective control means in the injection molding machine. In addition, the automatic control unit 66 is constructed such that it can be connected to an external memory 90 through an interface 88 in order to enter from the outside a control program being precedently designed.

In such a configuration of a fully automatic operation system according to the present invention as described above, the automatic control unit 66 fully-automatically performs these successive operations so that in case of the abnormal condition being occurred between a start-up and an end of molding the predetermined number of products the injection molding machine may stop the molding operation and thereafter restart according to a timing of the stop based on the data detected by the respective sensors.

In addition, the fully automatic operation system according to the present invention is described in more detail hereinafter. FIGS. 3 to 8 respectively are flow charts showing control programs for performing with the automatic control unit 66 the fully automatic operation of the injection molding machine having the system configuration shown in FIG. 1. First of all, the fully automatic operation system according to the present invention is described hereinafter with reference to FIG. 3.

Figure 3:
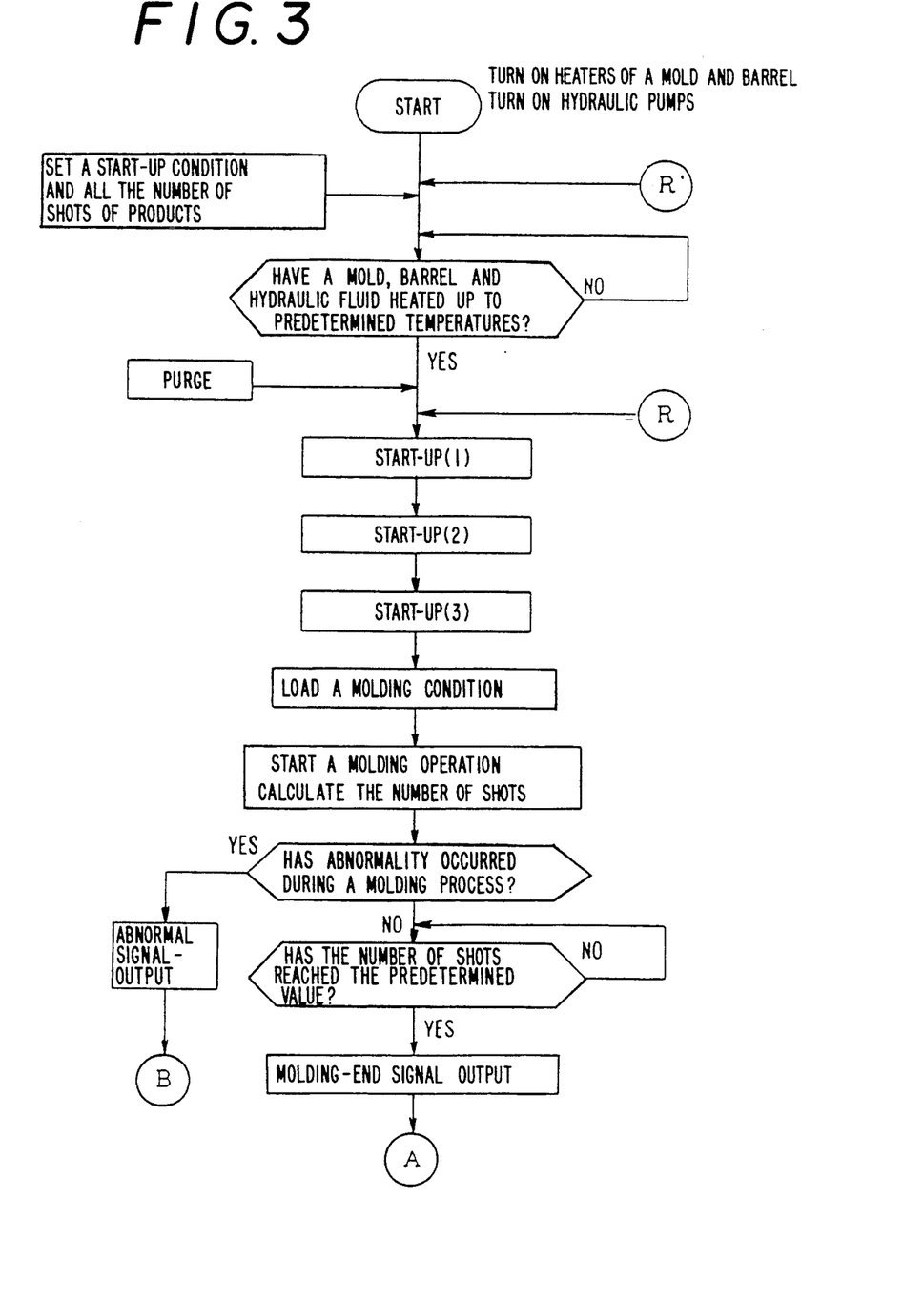
FIGS. 3 to 6 are flow charts showing a control program implementing the fully automatic operation system according to a preferred embodiment of the present invention.
Figure 4:
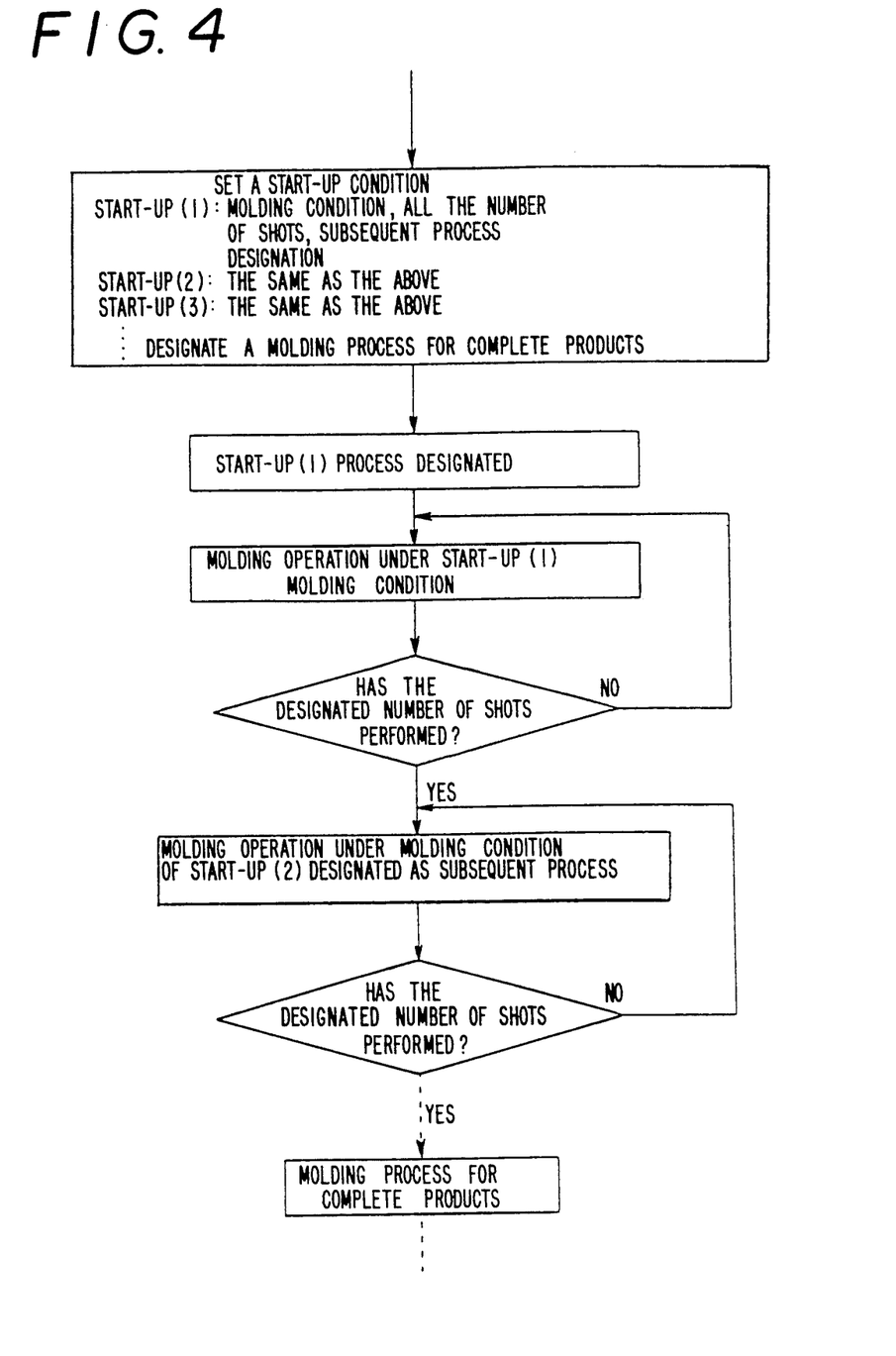
Figure 5:
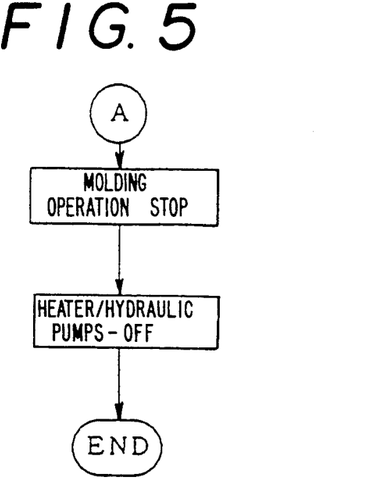
Figure 6:
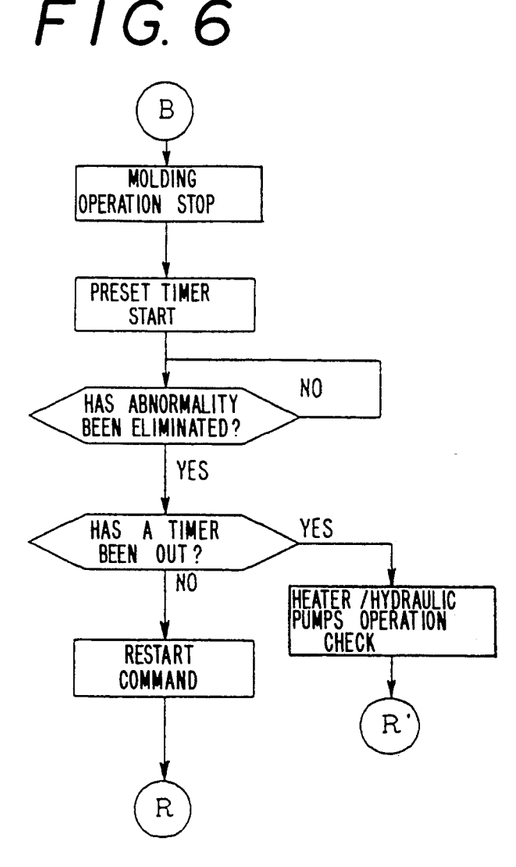

Before initiating an operation of the injection molding machine, an automatic control program shown in FIG. 3 performs ON operations of hydraulic pumps 32 and 34 once an operator performs ON operations of respective heaters for a mold 12 and a barrel 18. A start-up condition and all the number of shots of molded products are then set. Accordingly, as shown in FIG. 4, a setting of the start-up condition is required for a setup operation of the injection molding machine in order to successfully carry out a subsequent molding process for complete products. The setting is performed for each step of start-ups (1), (2), (3) . . . , and the like. Therefore, the start-up condition to be set includes the molding condition, all the number of shots and a designation of a subsequent process for each start-up. After the setting of the last start-up condition is completed, a setting of molding condition for the subsequent process in which the complete products are molded is successively performed. After the above-mentioned settings respectively are completed, the automatic control unit 66 judges that a hydraulic fluid as well as the mold 12 and the barrel 18 is heated up to a predetermined temperature. When it has judged so, respective lamps 86 are lit through a control I/O device 68. Then, the operator commands the automatic control unit 66 to perform a purge operation and loads to the automatic control unit the start-up condition mentioned above. The automatic control unit 66 sends a control command to a control unit 82 so that in the injection molding machine a start-up operation is initiated after performing the purge operation. In case the start-up operation comprising a plurality of steps is executed in step-by-step manner, the first start-up (1) step is initiated under the predetermined molding condition. After all the number of shots designated in such a step is completely produced, a subsequent start-up step is initiated. After the start-up operation comprising a plurality of steps (three steps in this embodiment) is executed in the same way described above, the molding condition for completely molded products is loaded and a molding operation is started. The number of shots are calculated and recorded each time the molding operation is executed. When a failure or abnormality of a controller, etc. and an incomplete molding occur continuously in such a molding process, the control unit 82 and other control devices detect the abnormal conditions and enter a abnormal signal to the automatic control unit 66. Otherwise if such abnormal conditions do not occur in the molding process and the number of shots reaches the predetermined value, the control unit 82 enters a molding-end signal to the automatic control unit 66 so that all of heaters and hydraulic pumps can be turned off after stopping the injection molding operation based on a control program shown in FIG. 5. If the abnormality occurs during the molding process as described above, a timer starts once the molding operation stops based on a control program shown in FIG. 6. In case the timer indicates that the time elapsed to remove the abnormality ranges within the predetermined value, a restart command are delivered to perform a restart operation at a start-up point. Consequently in case the timer indicates that the time exceeds the predetermined value, after checking the operation of the heaters and hydraulic pumps, the start-up condition and all the number of shots are reset in order to restart at the above-mentioned start-up operation. In this case, if it is ascertained that any heater or hydraulic pump is inoperative due to any failure and the like, all of the heaters and hydraulic pumps are tuned off.

Figure 7:
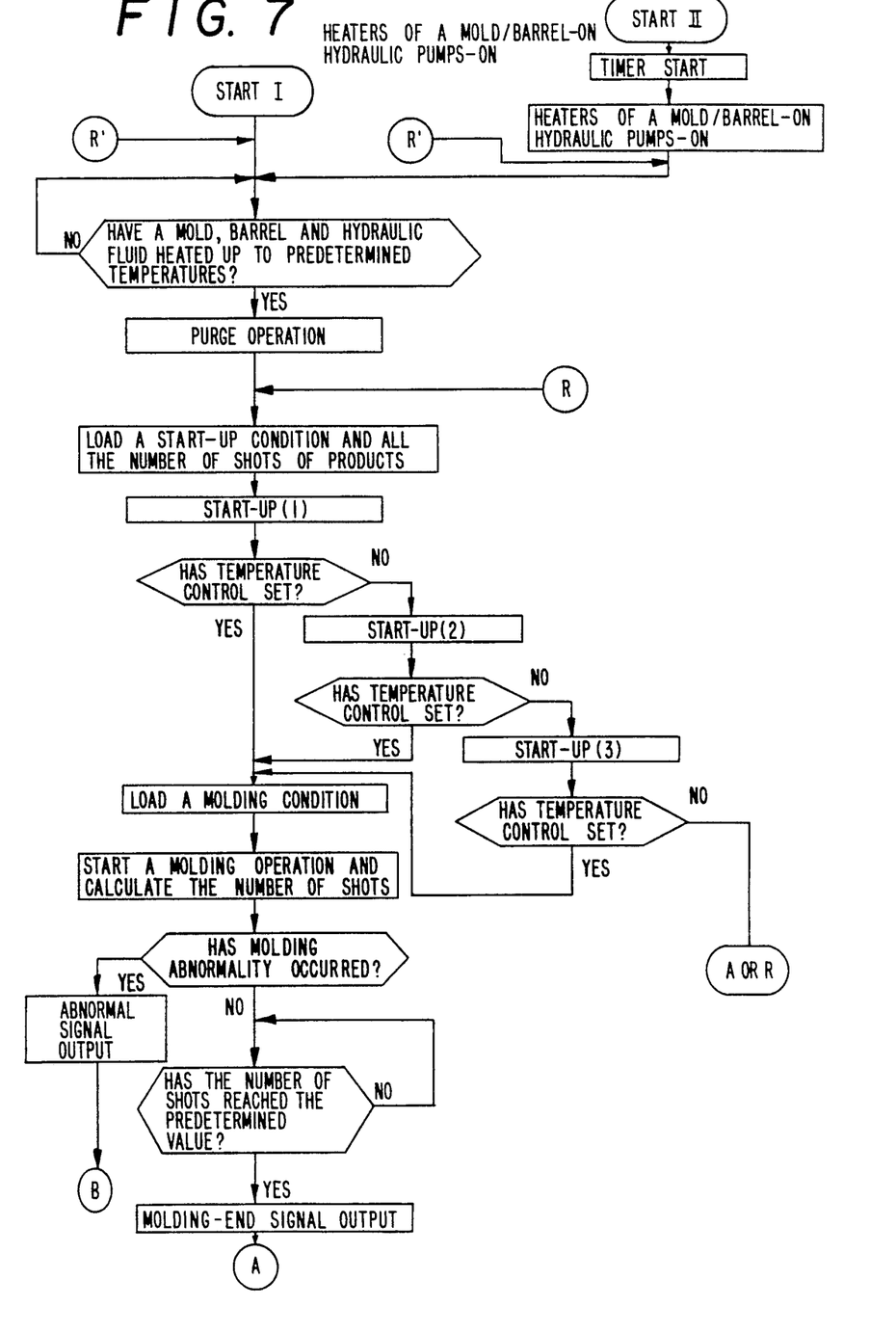
FIGS. 7 and 8 are flow charts showing a control program implementing the fully automatic operation system according to another preferred embodiment of the present invention.
Figure 8:
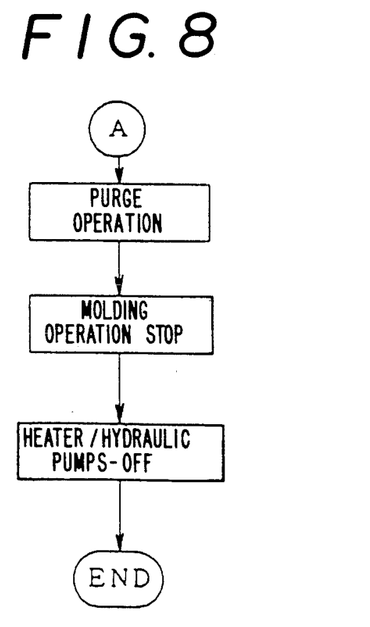

FIG. 7 shows another control program of a fully automatic operation system according to the present invention. In this embodiment according to the invention, as compared with FIG. 3, a purge operation and a setting of a start-up condition are respectively and automatically performed in an automatic control unit 66 when a mold 12, a barrel 18 and a hydraulic fluid are heated up to the respective adequate temperatures. At three steps of the start-up operation, when judging whether or not a setting of a temperature control of the mold 12 and the barrel 18 in accordance with a molding condition is completed, for example, and when even one step of the start-up operation satisfies a predetermined setting condition of the temperature control, the molding condition for completely molded products is loaded to start a molding of the products. Other control programs are the same as shown in FIG. 3. In the embodiment, the control program in which a molding-end signal is generated is designed so that a purge operation is automatically performed as shown in FIG. 8. Further, in the embodiment, for example, a calendar time may be employed so that ON operations of heaters for the mold 12 and the barrel 18 and of hydraulic pumps 32 and 34 can be full-automatically performed.

As described above, according to the invention, a fully automatic operation of an injection molding machine can be properly and smoothly performed from the start-up operation to the end of the molding of products in the predetermined number of shots by suitably using control programs shown in FIGS. 3 to 8.

In such a case, the embodiment according to the invention may be provided so that, if desired, an operator selects and loads the respective control programs being stored in an automatic control unit 66, as shown in FIGS. 3 to 7, in order to generally use this type of fully automatic operation system for a variety of injection molding machines.

The fully automatic operation system according to the present invention is implemented so that various data items being preset as the initial molding condition (such as data regarding injection pressure, injection speed, injection period, injection screw position and the like) are stored in a memory of the automatic control unit 66 in order to check for the molding condition of the injection molding machine after three to six months are elapsed. The checking of the molding condition is performed by comparing the stored data and those taken from the actual operation upon the time. In such a case, when a deviation between these data exceeds a tolerance, a maintenance for the molding condition is executed. Therefore, since the molding condition for completely molded products can be always stabilized, it is possible to more conveniently and smoothly perform the fully automatic operation of such a injection molding machine.

As apparent from the hereinbefore described embodiments according to the present invention, there is provided a fully automatic operation system for an injection molding machine which requires complicate start-up conditions in the injection molding process. In the fully automatic operation system, an automatic start-up operation is initiated by properly and conveniently ascertaining these start-up conditions by means of a computer control and thereafter the molding of the complete products is started. To this end, the molding conditions for completely molded products are determined properly and conveniently. In addition, a molding operation is immediately stopped upon an occurrence of an abnormality during a molding process and the injection molding machine is automatically and effectively restarted after removing the abnormality. Therefore, it is possible to considerably facilitate an operator's work and improve an operating ratio of the injection molding machine. Moreover, at the end of the molding operation for a specified number of shots, all operations of the injection molding machines are full-automatically terminated without the operator's work. Upon the termination, the injection molding machine is retained in a wait state suitable for restarting a subsequent molding operation. Accordingly, an operator's maintenance work can be extremely facilitated so that a performance of the automatic control system of such a injection molding machine can be efficiently improved.

Although the present invention has been described hereinbefore with its preferred embodiments, it will be appreciated that many variations and modifications may be made without departing from the spirit and scope of the invention.

What is claimed is:

1. A fully automatic operating system for an injection molding machine including an injection device, a mold and a mold clamping device, said system comprising:

detecting means for detecting initialization temperatures at which conditions of a mold part, a barrel of the injection device and a hydraulic fluid are optimized for a start-up operation of the injection molding machine;

start-up condition setting means for setting a condition to perform a start-up operation comprising a plurality of steps after initialization temperatures are set;

molding condition setting means for setting a condition to start a molding of complete products after a termination of the start-up operation;

means for counting the number of shots of products once a molding of the products starts and for generating a molding-end signal when the number of shots reaches a set value;

means for detecting and judging an abnormal condition, and generating an abnormal signal in case the abnormal condition occurs during a molding process;

an automatic control unit for:

judging that said initialization is completed by entering a detection signal when said initialization temperatures are reached;

commanding to stop a molding operation by entering a molding-end signal while generating control signals to respective control devices by loading a start-up condition; and counting a time elapsed from a temporary stop in response to entrance of an abnormal signal up to a restart of a molding operation, so that the start-up operation restarts if the elapsed time being counted does not exceed a predetermined value, and so that heaters and hydraulic pumps are turned off if the elapsed time being counted exceeds the predetermined value.

2. The system according to claim 1, wherein said start-up condition setting means sets a molding condition, all the number of shots and subsequent steps to be designated, respectively, so that the molding operation can start under the set molding condition when a mold port and a barrel are heated up to the respective temperatures being set for a molding of complete products while a molding condition setting means for setting a complete molding condition can be operated after the end of the required start-up operation.

3. The system according to claim 1 further comprising means for setting a timing for ON operations of the heaters for the molds and barrels and of the hydraulic pumps and performing the ON operations in order to start initialization of the temperatures of the mold ports and barrels and the temperature of the hydraulic fluid.

* * * * *